United States Patent [19]
Moore

[11] Patent Number: 5,908,077
[45] Date of Patent: Jun. 1, 1999

[54] ENVIRONMENTALLY SENSITIVE HYBRID VEHICLE

[75] Inventor: Thomas S. Moore, Northville, Mich.

[73] Assignee: Chrysler Corporation, Auburn Hills, Mich.

[21] Appl. No.: 08/380,270

[22] Filed: Jan. 30, 1995

[51] Int. Cl.[6] ........................................... B60K 6/04
[52] U.S. Cl. ............................... 180/65.2; 180/2.2
[58] Field of Search ..................... 180/2.2, 65.1, 180/65.2, 65.3, 65.8, 68.5, 67.5, 243, 244, 69.4; 123/527, DIG. 2; 280/834

[56] References Cited

U.S. PATENT DOCUMENTS

| | | | |
|---|---|---|---|
| 871,098 | 11/1907 | Albrecht | 180/243 |
| 937,859 | 10/1909 | Pieper | 180/65.2 |
| 1,017,198 | 2/1912 | Bender | 180/65.1 |
| 1,469,264 | 10/1923 | Lubeck | 188/159 |
| 1,874,604 | 8/1932 | Roche | 180/65.2 |
| 2,808,892 | 10/1957 | Walker | 180/69.4 |
| 2,918,982 | 12/1959 | Vlachos | 180/304 |
| 3,057,427 | 10/1962 | Glasgow | 180/243 |
| 3,352,373 | 11/1967 | Tuck | 180/65.2 |
| 3,502,165 | 3/1970 | Matsukata | 180/65.2 |
| 3,650,255 | 3/1972 | McJones | 123/527 |
| 3,853,194 | 12/1974 | Peterson | 180/7.3 |
| 3,861,484 | 1/1975 | Joslin | 180/65.2 |
| 3,888,325 | 6/1975 | Reinbeck | 180/65.2 |
| 3,904,883 | 9/1975 | Horwinski | 290/50 |
| 3,923,115 | 12/1975 | Helling | 180/65.2 |
| 3,948,224 | 4/1976 | Knapp et al. | 123/527 |
| 3,972,380 | 8/1976 | Hudson et al. | 180/65.3 |
| 4,090,577 | 5/1978 | Moore | 180/243 |
| 4,098,248 | 7/1978 | Todd | 123/527 |
| 4,106,581 | 8/1978 | West et al. | 180/69.5 |
| 4,141,425 | 2/1979 | Treat | 180/2.2 |
| 4,148,192 | 4/1979 | Cummings | 60/716 |
| 4,165,795 | 8/1979 | Lynch et al. | 180/65.2 |
| 4,180,138 | 12/1979 | Shea | 180/65.2 |
| 4,216,839 | 8/1980 | Gould et al. | 180/65.1 |
| 4,267,895 | 5/1981 | Eggert, Jr. | 180/68.1 |
| 4,305,254 | 12/1981 | Kawakatsu et al. | 60/716 |
| 4,335,429 | 6/1982 | Kawakatsu | 364/424.01 |
| 4,351,405 | 9/1982 | Fields et al. | 180/65.2 |
| 4,368,795 | 1/1983 | Tidwell | 180/212 |
| 4,400,997 | 8/1983 | Fiala | 74/661 |

(List continued on next page.)

FOREIGN PATENT DOCUMENTS

| | | | |
|---|---|---|---|
| 0 460 850 A2 | 12/1991 | European Pat. Off. | 180/65.1 |
| 1009338 | 5/1952 | France | 180/243 |
| 35 23 325 A1 | 1/1987 | Germany | 180/65.3 |
| 2 096 954 | 10/1982 | United Kingdom | 180/65.1 |
| 92/20544 | 11/1992 | WIPO | 180/65.2 |

*Primary Examiner*—J J Swann
*Assistant Examiner*—Frank Vanaman
*Attorney, Agent, or Firm*—Mark P. Calcaterra

[57] ABSTRACT

A hybrid vehicle includes a vehicle frame having a pair of rails disposed in spaced relationship relative to each other and defining a longitudinal axis of the vehicle, a pair of axles disposed spaced from one another and extending substantially transverse to the longitudinal axis with each of the pair of axles including a pair of wheels operatively mounted thereto for rolling engagement with a surface, an internal combustion engine mounted for driving engagement of one of the pair of wheels through one of the axles and an electric motor mounted for driving engagement of the other pair of wheels through the other axle, and a set of batteries disposed parallel to the longitudinal axis of the vehicle and between the internal combustion engine and the electric motor for providing an electrical power source to the electric motor.

9 Claims, 1 Drawing Sheet

U.S. PATENT DOCUMENTS

| | | | |
|---|---|---|---|
| 4,405,029 | 9/1983 | Hunt | 180/65.2 |
| 4,470,476 | 9/1984 | Hunt | 180/65.2 |
| 4,533,011 | 8/1985 | Heidemeyer et al. | 180/65.2 |
| 4,548,042 | 10/1985 | Brothers et al. | 60/668 |
| 4,585,085 | 4/1986 | Handel et al. | 180/65.2 |
| 4,602,694 | 7/1986 | Weldin | 180/2.2 |
| 4,697,660 | 10/1987 | Wu et al. | 180/65.2 |
| 4,762,191 | 8/1988 | Hagin et al. | 180/14.2 |
| 4,923,025 | 5/1990 | Ellers | 180/65.2 |
| 4,924,956 | 5/1990 | Deng et al. | 180/65.3 |
| 5,012,781 | 5/1991 | Yokoyama et al. | 123/527 |
| 5,015,545 | 5/1991 | Brooks | 180/68.5 |
| 5,064,013 | 11/1991 | Lenz | 180/65.3 |
| 5,147,003 | 9/1992 | De Monclin | 180/65.2 |
| 5,251,721 | 10/1993 | Örtenheim | 180/65.2 |
| 5,327,987 | 7/1994 | Abdelmalek | 180/65.4 |
| 5,343,970 | 9/1994 | Severinsky | 180/65.2 |
| 5,370,418 | 12/1994 | Pugh | 180/69.5 |
| 5,495,906 | 3/1996 | Furutani | 180/65.2 |

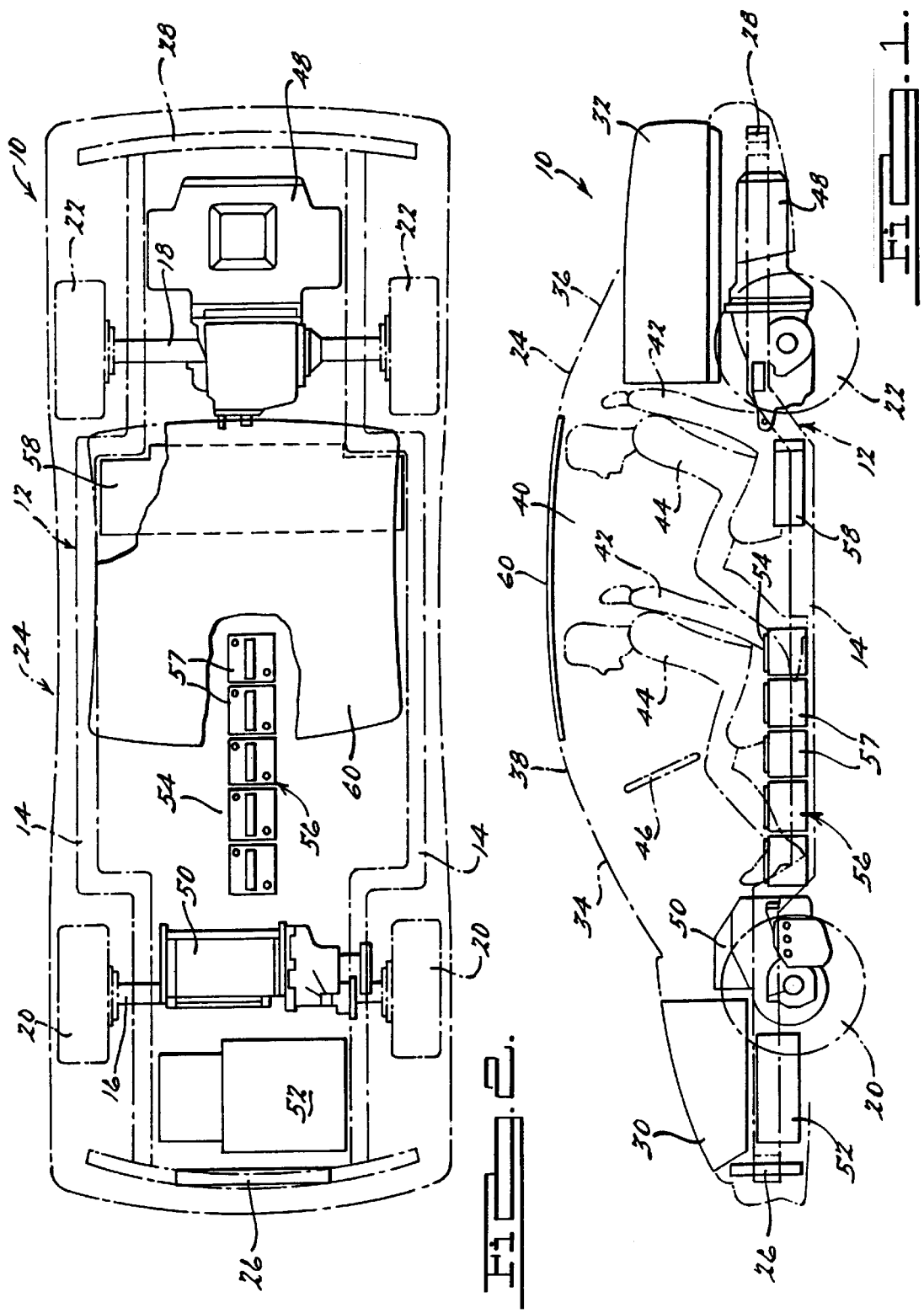

ENVIRONMENTALLY SENSITIVE HYBRID VEHICLE

BACKGROUND OF THE INVENTION

1. Field of the Invention

The present invention relates generally to hybrid vehicles and, more particularly, to an environmentally sensitive hybrid vehicle in which an internal combustion engine drives one pair of wheels and an electric motor drives another pair of wheels.

2. Description of the Related Art

Hybrid vehicles employing internal combustion engines and electric motors to drive the vehicle are well known in the art. Typically, in the past, hybrid vehicles have suffered from being underpowered or have produced unacceptable levels of potentially hazardous emissions during stop and go or intermittent operation such that advantages over single internal combustion engine vehicles have not been significant. Hybrid vehicles which have attempted to merge internal combustion engines and electric motors have also suffered from design deficiencies in the location of these components in the vehicle. Such previous design deficiencies have added to the impracticality of such vehicles.

Compressed natural gas (CNG) has long been admired as a fuel source because of its low cost, low emissions from combustion and relatively high octane values. While the use of CNG powered vehicles is also known in the art, use of CNG as a fuel source has typically been limited to larger vehicles, such as trucks, due in part to the relatively large size of the fuel tanks necessary to power these vehicles over an acceptable range. Still, the abundant resources of natural gas in the United States and the economic and governmental motives now extant to reduce the level of potentially hazardous emissions created from conventionally powered vehicles makes the use of hybrid vehicles using CNG powered internal combustion engines an important objective. Thus, there is a need in the art to provide a hybrid vehicle which effectively packages the necessary power components of the vehicle with acceptable ranges between fueling stops such that the vehicle is economically viable.

SUMMARY OF THE INVENTION

It is, therefore, one object of the present invention to provide an environmentally sensitive hybrid vehicle.

It is another object of the present invention to provide a hybrid vehicle which employs an internal combustion engine to drive one pair of wheels and one electric motor to drive another pair of wheels.

It is yet another object of the present invention to provide a hybrid vehicle which employs an internal combustion engine powered by compressed natural gas.

To achieve the foregoing objects, the present invention is a hybrid vehicle including a vehicle frame having a pair of rails disposed in spaced relation relative to each other and defining a longitudinal axis of the vehicle. The hybrid vehicle also includes a pair of axles spaced longitudinally from one another and extending substantially transverse to the longitudinal axis of the vehicle. On each axle is a pair of wheels operatively mounted thereto for rolling engagement with a surface. The hybrid vehicle includes an internal combustion engine mounted for driving engagement of one pair of the wheels through one of the axles and an electric motor mounted for driving engagement of the other pair of wheels through the other axle. The hybrid vehicle further includes a set of batteries disposed parallel to the longitudinal axis of the vehicle between the internal combustion engine and the electric motor for providing an electrical power source to the electric motor.

One advantage of the present invention is that an environmentally sensitive hybrid vehicle is provided. Another advantage of the present invention is that the hybrid vehicle employs an internal combustion engine to drive one pair of wheels and an electric motor to drive another pair of wheel. Yet another advantage of the present invention is that the hybrid vehicle has an internal combustion engine powered by compressed natural gas (CNG). In this way, the hybrid vehicle is powered during steady state operation by the CNG internal combustion engine thus reducing the amount of potentially hazardous emissions relative to conventional gasoline powered internal combustion engines. Still another advantage of the present invention is that the hybrid vehicle, during periods of acceleration or under increased torque requirements, is provided with an electric motor engaged to drive the other pair of wheels through the other axle. A further advantage of the present invention is that the batteries necessary for powering the electric motor are efficiently stored between the internal combustion engine and the electric motor and disposed parallel to the longitudinal axis of the vehicle. A still further advantage of the present invention is that the hybrid vehicle includes all the advantages of electrically as well as CNG powered engines while still maintaining design freedom such that a commercially viable vehicle may be produced.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 1 is a fragmentary elevational view of a hybrid vehicle, according to the present invention.

FIG. 2 is a plan view of the hybrid vehicle of FIG. 1.

DESCRIPTION OF THE PREFERRED EMBODIMENT(S)

Referring to FIGS. 1 and 2, a hybrid vehicle, according to the present invention, is generally shown at 10. The vehicle 10 includes a vehicle frame, generally indicated at 12, having a pair of rails 14 disposed in spaced relationship relative to one another and defining a longitudinal axis of the vehicle 10. The vehicle 10 also includes a front axle 16 and a rear axle 18 disposed spaced from one another and extending substantially transverse to the longitudinal axis of the vehicle 10. The front axle 16 and rear axle 18 are operatively connected to the rails 14 as is known in the art. The front axle 16 includes a pair of front wheels 20 and the rear axle 18 includes a pair of rear wheels 22. Both front and rear wheels 20, 22, respectively are operatively mounted to their respective axles for rolling engagement with a surface such as a road as is known in the art.

The vehicle 10 includes a vehicle body, generally indicated at 24, which is supported upon the vehicle frame 12. The vehicle body 24 may have many of the components typically associated with automotive vehicles but it is to be understood that the vehicle body 24 may be styled in any way contemplated by the designer and the following discussion of certain common components of the vehicle body 24 is by way of description only and not by way of limitation. More specifically, the vehicle body 24 may include a front bumper 26 and a rear bumper 28 attached to the rails 14 and a forward storage compartment 30 and rear storage compartment 32. The vehicle body 24 may include a windshield 34, rear window 36 and roof line 38 as commonly known in the art. The vehicle body 24 defines an occupant compartment 40 having any number of seats 42 so as to accommodate occupants 44. The vehicle body 24 includes a steering wheel assembly 46 in the forward portion of the occupant compartment 40 to steer the vehicle 10 as is commonly known in the art.

The vehicle 10 further includes an internal combustion engine 48 mounted for driving engagement of the rear wheels 22 through the rear axle 18. The engine 48 is mounted slightly behind the rear axle 18 and supported by the rails 14 as is known in the art. The internal combustion engine 48 is preferably of the two stroke cycle type adapted for burning a fuel such as compressed natural gas (CNG). Thus, as a two stroke cycle type, the internal combustion engine 48 has no poppet valves or cams to operate the intake and exhaust ports in the cylinders. The CNG two stroke internal combustion engine 48 has fewer parts and is less expensive than conventional four stroke gasoline or diesel engines. In the preferred embodiment, the two stroke cycle internal combustion engine 48 has a one-third (⅓) liter capacity which generates twenty-four (24) horsepower. Further, the vehicle 10 employs a computer shifted manual transmission (not shown) to transfer power from the internal combustion engine 48 to the rear axle 18. Thus, the internal combustion engine 48 of the present invention is sufficient to cruise up to eighty (80) mph with a minimized coefficient of drag in the frontal area of the vehicle 10 and rolling resistance. It should be appreciated that other suitable types of internal combustion engines and fuel may be used.

The vehicle 10 also includes an electric motor 50 mounted for driving engagement of the front wheels 20 through the front axle 16. The vehicle 10 includes a controller 52 disposed forward of the front axle 16 and below the forward storage compartment 30. The controller 52 operates to control the driving engagement of the front axle 16 and rear axle 18 by the electric motor 50 as well as the two stroke engine 48. More specifically, during intermittent or stop and go operation as well as during periods where acceleration or greater torque is required, the controller 52 signals the electric motor 50 to engage the front axle 16 to drive the front wheels 20. In the preferred embodiment, the electric motor 50 is a forty (40) horsepower AC motor which is directly coupled to the front wheels 20 through the axle 16 as is known in the art.

The vehicle 10 includes a tunnel 54 formed by the vehicle body 24 and disposed parallel to the longitudinal axis of the vehicle 10 and between the internal combustion engine 48 and the electric motor 50. The vehicle 10 also includes a set of batteries, generally indicated at 56, mounted or housed within the tunnel 54 of the vehicle body 24 and parallel to the longitudinal axis of the vehicle 10 and between the internal combustion engine 48 and the electric motor 50. More specifically, the set of batteries 56 are substantially centrally disposed and equidistant between the rails 14 of the vehicle frame 12 as illustrated, for example, in FIG. 1. In the preferred embodiment, the set of batteries 56 include five (5) power cells or batteries of the bi-polar, deep cycle lead-acid type and provide an electrical power source for the electrical motor 50. While five (5) batteries 57 are shown in the figures, the set of batteries 56 may include any number of individual batteries or power cells 57 and the specific number is dictated by other design parameters not pertinent to the present invention. In addition, the vehicle 10 includes a fuel tank 58 disposed between the rails 14 and also between the internal combustion engine 48 and the electric motor 50. Moreover, the fuel tank 58 is also disposed between the internal combustion engine 48 and the set of batteries 56. The fuel tank 58 may be of any capacity but a twenty (20) gallon tank is contemplated by the vehicle 10 of the present invention.

The vehicle 10 further includes a plurality of solar cells 60 disposed at the roof or roof line 38 of the vehicle 10 for collecting and converting solar energy into electrical energy and operatively connected to the set of batteries 56 for charging same. In its operative mode, the internal combustion engine 48 is disconnected during braking of the vehicle 10. As mentioned earlier, the controller 52 then signals the electric motor 50 such that it engages to operate as a generator during deceleration to recharge the batteries 56. Thus, the electric motor 50 also acts as a brake, slowing the vehicle 10 during periods when deceleration is required.

In this way, the vehicle 10 is powered during steady state operation by the internal combustion engine 48 thus reducing the amount of potentially hazardous emissions relative to conventional gasoline powered internal combustion engines and also maintaining excellent efficiencies (est. 70 mpg metro-highway). During periods of acceleration or under increased torque requirements, the electrically powered motor 50 is engaged to drive the front pair of wheels 20 through the front axle 16. The batteries 57 necessary for powering the electric motor 50 are stored between the internal combustion engine 48 and the electric motor 50. More specifically, the batteries 57 are disposed parallel to the longitudinal axis of the vehicle 10 and equidistant between the rails 14 of the vehicle frame 12. The vehicle 10 of the present invention thus solves a particular problem in conventional hybrid vehicles with the arrangement and relative duties of the necessary components of a hybrid vehicle with surprising unanticipated results.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A hybrid vehicle comprising:

a vehicle frame having a pair of rails disposed in spaced relation relative to each other and defining a longitudinal axis of the vehicle, a pair of axles spaced longitudinally from one another and extending substantially transverse to said longitudinal axis and operatively connected to said rails, each with a pair of wheels operatively mounted thereto for rolling engagement with a surface;

an internal combustion engine operatively connected to said rails and disposed slightly behind a rear one of said pair of axles for driving engagement of a rear pair of said wheels through said rear one of said axles and an electric motor operatively connected to said rails and disposed substantially adjacent a front one of said pair of axles for driving engagement of a front pair of said wheels through said front one of said axles;

a set of batteries operatively connected to said rails and substantially centrally disposed equidistant between said pair of rails so as to be parallel to said longitudinal axis of said vehicle and between said internal combustion engine and said electric motor for providing an electrical power source to said electric motor; and a fuel tank operatively connected to and disposed between said rails and slightly in front of said rear one of said axles so as to be between said internal combustion engine and said set of batteries.

2. A hybrid vehicle as set forth in claim 1 including a vehicle body defining a tunnel disposed parallel to said longitudinal axis of said vehicle between said internal combustion engine and said electric motor, said set of batteries housed within said tunnel of said body and operatively connected to said electric motor.

3. A hybrid vehicle as set forth in claim 1 wherein said vehicle further includes a plurality of solar cells disposed at a roof of the vehicle for collecting and converting solar energy into electrical energy and operatively connected to said set of batteries for charging same.

4. A hybrid vehicle as set forth in claim 1 wherein said internal combustion engine is a two stroke cycle engine adapted for burning compressed natural gas.

5. A hybrid vehicle comprising:

a vehicle frame having a pair of rails disposed in spaced relationship relative to one another and defining a longitudinal axis of the vehicle, a front axle and a rear axle spaced longitudinally from one another and extending substantially transverse to said longitudinal axis of the vehicle and operatively connected to said rails, each of said front and rear axles including a pair of wheels operatively mounted thereto for rolling engagement with a surface;

a two stroke cycle internal combustion engine adapted for burning compressed natural gas operatively connected to said rails and disposed slightly behind said rear axle for driving engagement of said pair of wheels through said rear axle and an electric motor operatively connected to said rails and disposed substantially adjacent said front axle for driving engagement of said pair of wheels through said front axle;

a set of batteries operatively connected to said rails and substantially centrally disposed equidistant between said pair of rails so as to be parallel to said longitudinal axis of said vehicle and between said internal combustion engine and said electric motor for providing an electrical power source to said electric motor; and a fuel tank operatively connected to and disposed between said rails and slightly in front of said rear axle so as to be between said internal combustion engine and said set of batteries.

6. A hybrid vehicle as set forth in claim 5 including a vehicle body defining a tunnel disposed parallel to said longitudinal axis of said vehicle and between said internal combustion engine and said electric motor, said set of batteries housed within said tunnel of said vehicle body and operatively connected to said electric motor.

7. A hybrid vehicle comprising:

a vehicle frame having a pair of rails disposed in spaced relation relative to each other and defining a longitudinal axis of the vehicle, a pair of axles spaced longitudinally from one another and extending substantially transverse to said longitudinal axis and operatively connected to said rails, each having a pair of wheels operatively mounted thereto for rolling engagement with a surface;

an internal combustion engine operatively connected to said rails and disposed slightly behind a rear one of said pair of axles for driving engagement of a rear pair of said wheels through said rear one of said axles and an electric motor operatively connected to said rails and disposed substantially adjacent a front one of said pair of axles for driving engagement of a front pair of said wheels through said front one of said axles;

a vehicle body operatively connected to said rails and defining a tunnel disposed parallel to said longitudinal axis of the vehicle and between said internal combustion engine and said electric motor;

a set of batteries housed within said tunnel of said vehicle body and substantially centrally disposed equidistant between said pair of rails so as to be parallel to said longitudinal axis of said vehicle and between said internal combustion engine and said electric motor for providing an electrical power source to said electric motor; and a fuel tank operatively connected to and disposed between said rails and slightly in front of said rear one of said axles so as to be between said internal combustion engine and said set of batteries.

8. A hybrid vehicle as set forth in claim 7, including a plurality of solar cells disposed at a roof of the vehicle for collecting and converting solar energy into electrical energy and operatively connected to said set of batteries for charging same.

9. A hybrid vehicle as set forth in claim 7 wherein said internal combustion engine is a two stroke cycle engine adapted for burning compressed natural gas.

\* \* \* \* \*